(12) United States Patent
Mobeen (10) Patent No.: US 10,452,411 B2
(45) Date of Patent: Oct. 22, 2019

(54) SYSTEM AND METHOD OF USING EMOJIS FOR INTERACTIVE AND ENHANCED DATA MATCHING CAPABILITIES

(71) Applicant: Riyad Mobeen, Ontario (CA)

(72) Inventor: Riyad Mobeen, Ontario (CA)

( * ) Notice: Subject to any disclaimer, the term of this patent is extended or adjusted under 35 U.S.C. 154(b) by 148 days.

(21) Appl. No.: 15/396,112

(22) Filed: Dec. 30, 2016

(65) Prior Publication Data

US 2018/0189072 A1    Jul. 5, 2018

(51) Int. Cl.
| | |
|---|---|
| *G06F 9/451* | (2018.01) |
| *G06Q 50/00* | (2012.01) |
| *G06F 3/0488* | (2013.01) |
| *G06F 3/0484* | (2013.01) |
| *H04L 12/58* | (2006.01) |

(52) U.S. Cl.
CPC .......... *G06F 9/451* (2018.02); *G06F 3/04842* (2013.01); *G06F 3/04845* (2013.01); *G06F 3/04883* (2013.01); *G06Q 50/01* (2013.01); *H04L 51/32* (2013.01)

(58) Field of Classification Search
CPC ...................................................... G07C 13/00
USPC .................................................. 715/740, 752
See application file for complete search history.

(56) References Cited

U.S. PATENT DOCUMENTS

| | | |
|---|---|---|
| 8,584,031 B2 | 11/2013 | Moore et al. |
| 8,751,231 B1 | 6/2014 | Larsen |
| 8,919,339 B2 | 12/2014 | Rubinstein et al. |
| 9,244,907 B2 | 1/2016 | Leydon |
| 9,372,608 B2 | 6/2016 | Leydon |
| 2015/0006422 A1 | 1/2015 | Carter |
| 2015/0334075 A1* | 11/2015 | Wang ................ G07C 13/00 715/752 |
| 2017/0263248 A1* | 9/2017 | Gruber ................ G10L 15/22 |

* cited by examiner

*Primary Examiner* — Cao H Nguyen
(74) *Attorney, Agent, or Firm* — Kolawole Law Firm LLC; Jimi Kolawole (57) ABSTRACT

A method for ranking, matching, and recommending end-users wherein end-users respond to plurality of questions using emojis which have the capacity to encompass multiple data-points.

7 Claims, 7 Drawing Sheets

*When user changes size or places emoji in ordered list, the weight of the variable increases/ decreases in the algorithm. Example: a larger emoji equates that respective emoji has larger weight relative to other emoji entries (i.e. value).*

SYSTEM AND METHOD OF USING EMOJIS FOR INTERACTIVE AND ENHANCED DATA MATCHING CAPABILITIES

CROSS REFERENCE TO RELATED APPLICATION

Not Applicable

STATEMENT REGARDING FEDERALLY SPONSORED RESEARCH

Not Applicable

BACKGROUND OF THE INVENTION

This invention relates generally to a method and systems of capturing user interests, preferences, and emotions using emojis as a proxy for text words for matching.

The task of matching jobs, people, teams, businesses, and products, has become more important and customized in recent years. User information is gathered through various sources and can be captured from the Internet or from user inputted information. Many people are aware of using certain information on certain online platforms, social networks, and social profiles. Thus, there needs to be a system that helps people or organizations match jobs or potential relationship partners using accurate information that is not swayed by biases for different platforms or social networks. For example, some social networks are professionally oriented while others are socially oriented, resulting in users using different text and language for each.

Using emojis as a proxy for text allows users to accurately capture user intended interests, emotions, preferences, perceptions, and ideas with more ease and with the universal language of emojis.

SUMMARY OF THE INVENTION

Examples of the present disclosure provides a system for allowing users e.g. job candidates or dating candidates or employees or teams to provide and enter personalized data using emojis which have the capability of encapsulating multiple data points about the user which is then processed using algorithms to match, predict, and suggest data output in effort to uncover personality traits and sentiment.

Embodiments of the invention enable users to input details including but not limited to interests, emotions, preferences, perceptions, and ideas when answering questions or responding to prompts using emoji characters. In one embodiment, when recruiting, companies and HR staff typically receive paper- or text-based applications that are in the form of a resume or cover-letter. Outside of these text documents, employers must follow-up with a secondary interview of candidates through the phone, in-person sessions, questionnaires, or videos to glean insight into the candidate. This second filtering method of interviewing lacks true depth because it generally is not accurate as candidates have formulated answers based on well-known questions in an effort to give a well-received response. Candidates generally suffer from either having minimal opportunity to express or describe their desire for the job outside of the written or spoken word. Stated differently, the traditional job recruitment process does not provide room for candidates to describe intangibles. As such, candidates are limited in the methods of how they can convey their interests, emotions, preferences, perceptions, and ideas. They can use other types of media such as images, video, sounds; however, there is too much variation amongst these data inputs and can be subjective in their meaning, interpretation, and perception. Simple questions such as "Describe your personality" can be taxing for both parties.

Accordingly, there is a need for a system to help users directly respond to questions posed to them, using a common set of data points in the form of emojis, in which allows users to express and describe intangibles in ways that text, verbal, and written words do not allow for. The process of using a collection of emojis as a response to a prompted question or series of questions allows users to input many data points without having to enter words in the form of text.

In another embodiment, users that belong to a network can find and match based on common character traits for the purpose of relationships. Instead of being matched based on subjective filters such as images, users can gain a deeper sense of their own character by responding to questions with emojis. The emojis help to keep responses objective while leaving room for interpretation of each emoji character entered. Using a proprietary algorithm, the system matches user emojis across several dimensions to uncover compatibility with other users.

DETAILED DESCRIPTION OF THE INVENTION

The principles described in this invention may be embodied in many different forms. Not all of the depicted components may be required, however, and some implementations may include additional components. Variations in the arrangement and type of the components may be made without departing from the spirit or scope of the claims as set forth herein. Additionally, different or fewer components may be provided.

Reference throughout this specification to "one example," "an example," "examples," "one embodiment," "an embodiment," "example embodiment," or the like in the singular or plural means that one or more particular features, structures, or characteristics described in connection with an embodiment or an example is included in at least one embodiment or one example of the present disclosure. Thus, the appearances of the phrases "in one embodiment," "in an embodiment," "in an example embodiment," "in one example," "in an example," or the like in the singular or plural in various places throughout this specification are not necessarily all referring to the same embodiment. Furthermore, the particular features, structures, or characteristics may be combined in any suitable manner in one or more embodiments or examples.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

The typical environment for this invention may include a server, a client, and a communication network. The server and the client may be connected through the communication network for information exchange such as sending and receiving information. Although one client and one server is described, any number of servers or client may be included and other devices may also be included. The communication network may include any appropriate type of communication network for providing network connections to the server and client or among multiple servers or clients. For example, communication network may include the Internet, Bluetooth connections, or other types of computer networks or telecommunication networks, either wired or wireless. In a certain embodiment, the disclosed methods and apparatus may be implemented, for example, in a wireless network that includes at least one client.

In some cases, the client or the device may refer to any appropriate user terminal with certain computing capabilities, such as a personal computer (PC), a workstation computer, a server computer, a hand-held computing device (tablet), a smartphone or mobile phone, or any other user-side computing device. In various embodiments, the client may include a network access device. The client may be stationary or mobile.

A server, as used herein, may refer to one or more server computers configured to provide certain server functionalities, such as database management and search engines. A server may also include one or more processors to execute computer programs in parallel.

An emoji, also referred to as "ideogram" or "character" is a digital image or icon used to express an idea, emotion, or word, in electronic communication. An emoji can be described as a graphic symbol that represents an idea or concept, independent of any particular language, and specific words or phrases. Some ideograms are comprehensible only by familiarity with prior convention; others convey their meaning through pictorial resemblance to a physical object, and thus may also be referred to as pictograms. Emoji character sets have been incorporated into Unicode, a standard system for indexing characters, which has allowed them to be standardized across different operating systems. Although the word emojis, ideogram, emoticons, or ideograph may be interpreted differently, they are all construed to mean the same thing in this application.

It should be noticed that, the embodiments/examples and the features in the embodiments/examples may be combined with each other in a no conflict condition. This invention will become apparent from the following detailed description when taken in conjunction with the accompanying drawings. It should be noticed that, the steps illustrated in the flowchart of the drawings may be performed in a set of computer device with executable program codes. And the order of the steps may be different from that in the drawings under some status, although a logic order is shown in the flowchart.

Figure 1:
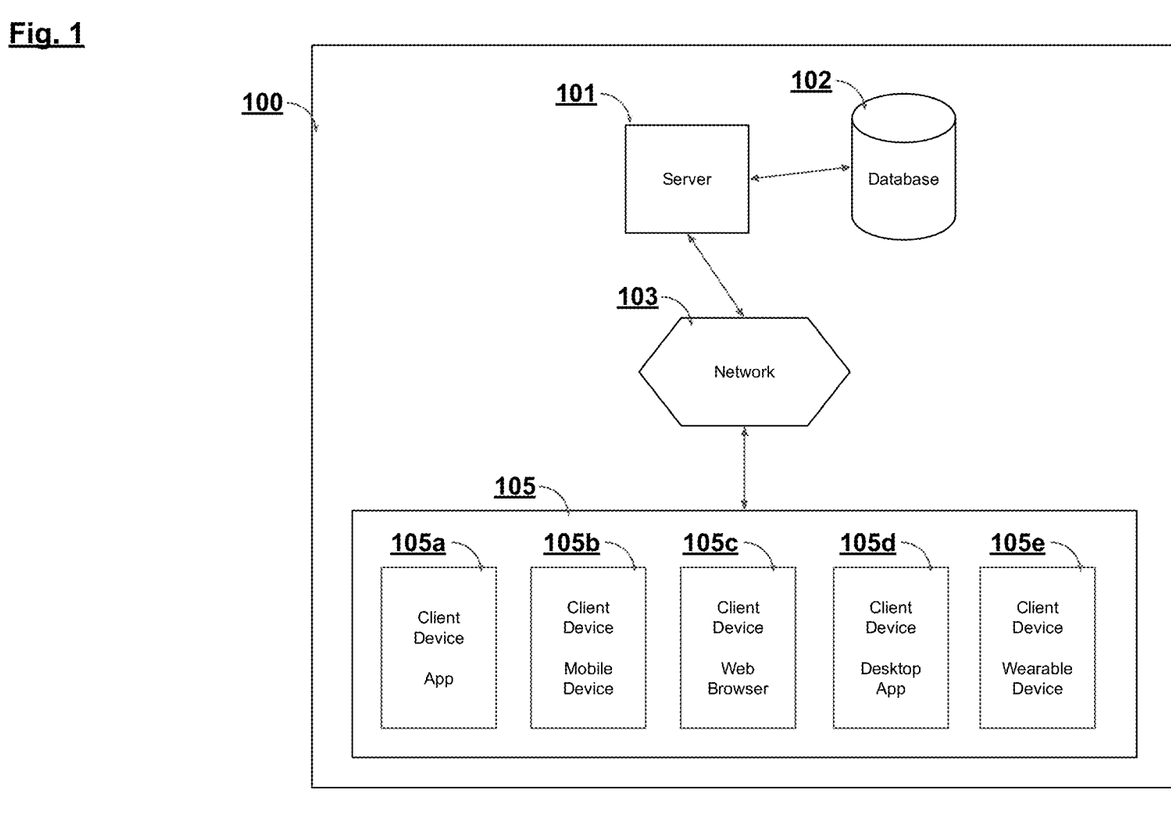
FIG. 1 is a block diagram of a system environment including a social networking system, in accordance with an embodiment of the invention.

FIG. 1 is an environment diagram of one embodiment of a system environment 100 including a server 101, a database 102, a network 103 and client devices 105. Client devices 105a, 105b, 105c, 105d, 105e, are individually referred to or collectively as 105. A client device 105 is a device capable of receiving user input as well as transmitting and/or receiving data via the network 103. A client device can include a computer application, a mobile device, a web browser, a desktop application, a wearable device, a personal computer or laptop, a tablet, or other computing device.

In one embodiment, a user executes an application allowing a user using the client device 105 to interact with the system 100. For example, a client device 105 executes a browser application to allow interaction between the client device 105 and the system 100 via the network 103. In another embodiment, a client device accesses the system via an application programming interface (API) that operates on various mobile operating systems. Client devices 105 communicate with the network 103, which is in turn is connected to the remote server 101 which stores data into one or more databases 102. In one embodiment, the client devices communicate with the network using the Internet connected and connecting to the internet via cellular data, cellular radio, WiFi, router, or some other access point. The system 100 comprises one or more clients connecting to the network simultaneously.

Figure 2:
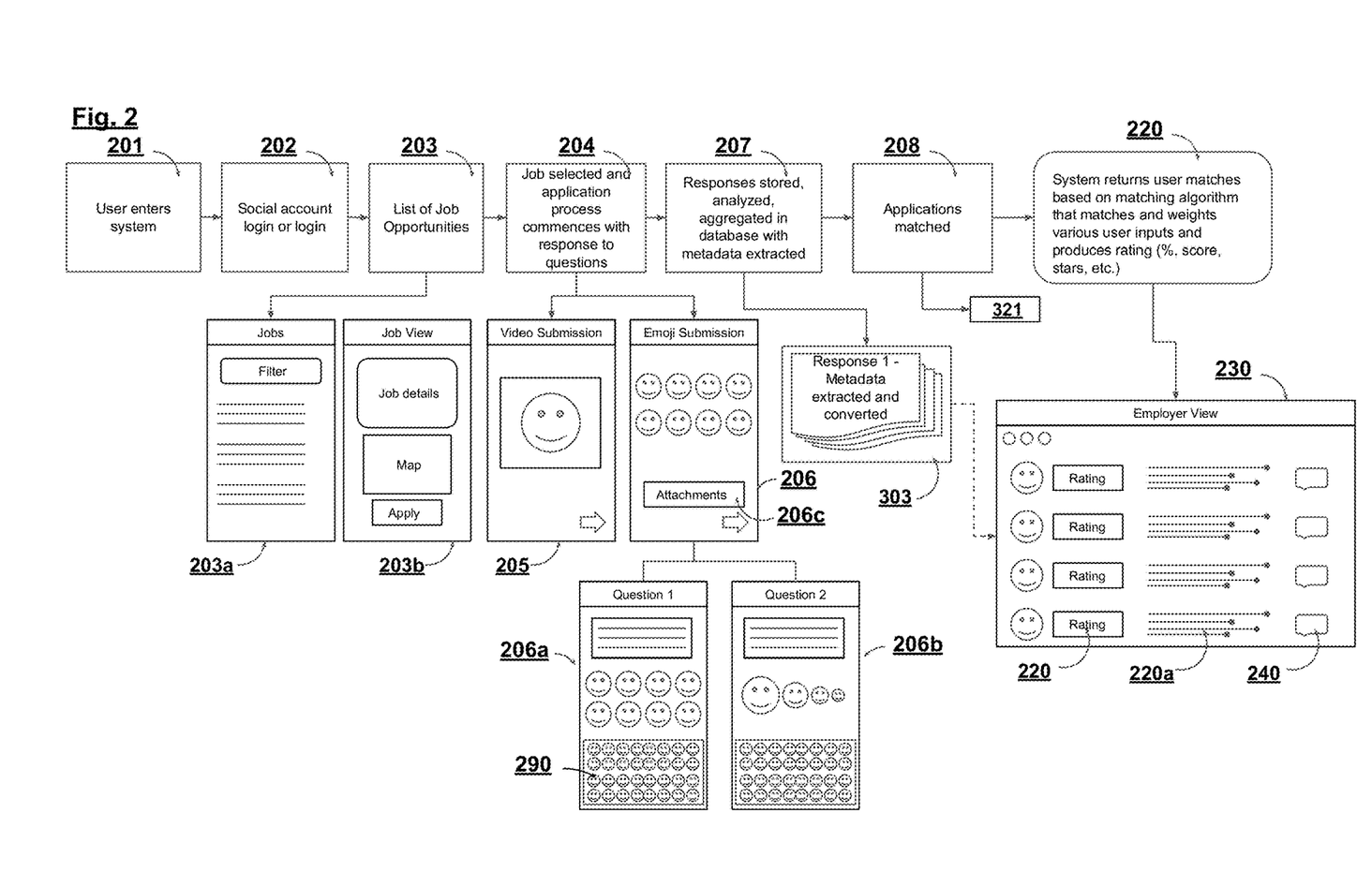
FIG. 2 is a block diagram of the processes involved in this invention which involves the steps and process a user may experience while using the system.

FIG. 2 is one embodiment of the system. In this embodiment, a flowchart for job seekers ("end-users") applying to jobs advertised by employers using emojis along with timed video introduction. In this embodiment, 201 shows users entering system through client devices 105. Each user then voluntarily provides social network credentials to login or by providing user-specific login credentials. User then views list of job advertisements 203. Users can filter jobs 203a based on various criteria including geography, pay/wages, type of placement, company name, industry, match rating, position title, etc. Once a user finds a job of interest 203b and chooses to apply to job they are prompted into the application process 204. The first step in the process is to record video introduction 205. Once video is recorded and uploaded to server 101, user is then prompted to answer questions 206, whereby a keyboard 290 is instantiated and users can enter emojis 206a and 206b and place them in hierarchy or importance according to Pitching System and size FIG. 7 (FIG. 7A, FIG. 7B, FIG. 7C, FIG. 7D) while adding attachments (e.g. resumes, cover letters, certifications, work samples, etc.). The keyboard that is instantiated is an electronic keyboard that is natively built into client devices. The system then stores responses both individual and aggregate responses (303a, 303b, 303c, etc.), analyzes responses, extracts metadata, and algorithm 321 is instantiated to match emojis to Employer Keyword Bank 302. System then returns user matches to employer and displaying them through 230. Employer has rating for each applicant job seeker 220 and 220a with function to instantiate direct communication with the job seeker 240.

Step 201: A client device 105 in the form of mobile device, mobile application, or web application is used to access the system.

Step 202: User inputs social login credentials to gain unique user information on the system. User provides what may be called user profile information which may include education, preferences, biographical information, and other personal information which is stored in the database 102.

Step 203: User is displayed with queried list of jobs available from the database. 203a enables user to search and filter jobs using filters which may include geographical proximity, pay grade, job title, etc. 203b illustrates how a single job posting may look which includes an action to 'apply' button.

Step 204: When user selects job to be applied to 203b, job application process is initiated.

Step 205: User records video via client device 105.

Step 206: User is prompted with series of questions where they must answer using emojis. 206a an emoji keyboard is instantiated 290, and user responds to questions with a selection of emojis which capture users' response that succinctly captures emotional, sensory, sentiment, preference, perception, idea, or feelings.

Step 207: Responses to questions are stored, analyzed, and aggregated FIG. 3.

Step 208: User responses matched within system.

Step 220: System returns matched users based on matching algorithm and produces ratings and scores of each matched user for the Employer.

Step 230: Employer can view matched job candidates with ability to view ratings 220 and 220a and message job candidates 240.

Figure 3:
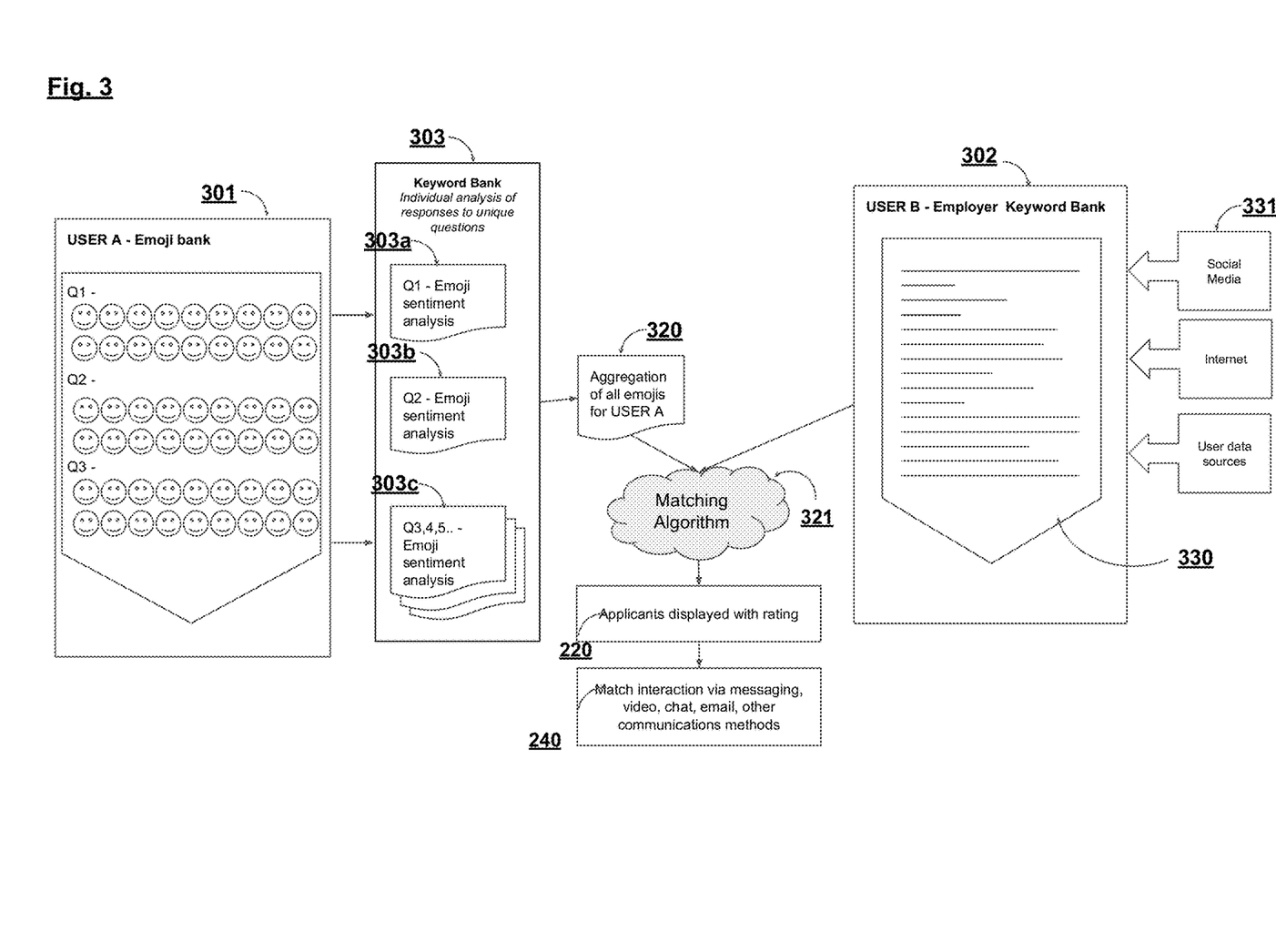
FIG. 3 is a schematic representation of the Sentimental Keyword analysis process which is used for the embodiment of job seeking.

FIG. 3 is a map of underlying matching process whereby user metadata from emojis are matched with employers' metadata. User "Emoji Bank" 301 is the aggregation of all job seeker responses from 206 and 208. The Emoji Bank is a collection of all the user responses in the form of emojis. All responses in "Keyword Bank" 303 are analyzed individually as responses 303a, 303b, 303c onwards. A sentimental analysis is the process of converting or substituting emojis with words, or series of words, that have been universally accepted as describing an emoji and thereafter trying to extract and deduce personality traits, trends, and other pieces of data related to the user as we all finding commonalities with other users. An example of validated personality trait would be averse to pairing an adventurous personality, e.g. sky-diver, bungee jumping individual to a risk-averse personality. Another example of a validated personality trait, is a user who is happy—indicated by the frequency of happy or happy-related emojis in their unique Emoji Bank. Another example of a personality trait can be deduced by the food and beverage emojis chosen by users. Then the metadata is stored 320 for each unique user application. Metadata in this example relates to the underlying keywords associated and attached to each emoji entered according to universally accepted definitions. The Keyword Bank contains words or series of words that are universally accepted to describe user-provided emojis. The Keyword Bank receives the output from the sentimental analysis process executed on the end-user selected emoji. The Keyword Bank is like the Emoji Bank, but differs in that it is a store for words. Each application 320 is then analyzed per algorithm 321 against Employer Keyword Bank 302 and rating produced 220 for each user displayed for employer 220. In this embodiment, a model profile can be defined as the Employer Emoji Keyword Bank 302. The system will match and cross-reference the keywords to the specific job—or model—that the employer would like to hire for.

Step 301: The User Emoji Bank contains and stores all the user selected emojis. These emojis are entered and stored into the Emoji Bank when the user responds to a question.

Step 302: The Employer Keyword Bank which contains a model profile for each job position. For example, a company's job details will encapsulate keywords which may be extracted from various sources such as the job posting, company website, social media, keywords entered by the company, and other data sources, and are stored in the Keyword Bank.

Step 303: Illustrates the collection of all user responses where each response is analyzed for sentiment. For each question, and for each emoji attached to a question, keywords that the emoji(s) aptly convey are appended to the collection of words appended to the question. This step is performed for every emoji response collected.

Step 320: The aggregation of all user responses to form a plurality of sentiments to be cross-referenced to the Employer Keyword Bank.

Step 321: The proprietary matching algorithm that allows the system to analyze commonalities between user responses and the Employer Keyword Bank. Proprietary algorithm may give weight to the selection of exact emojis, or exact words, or order or hierarchy of selection of emojis etc. For example, proprietary algorithm may give higher weight to a match where both parties select the same emojis, in the same order, with the same pitch or similar pitch.

Step 330: Collection of keyword data from multiple sources such as social media, internet, Employer data source.

Step 331: Potential sources of keyword data.

Figure 4:
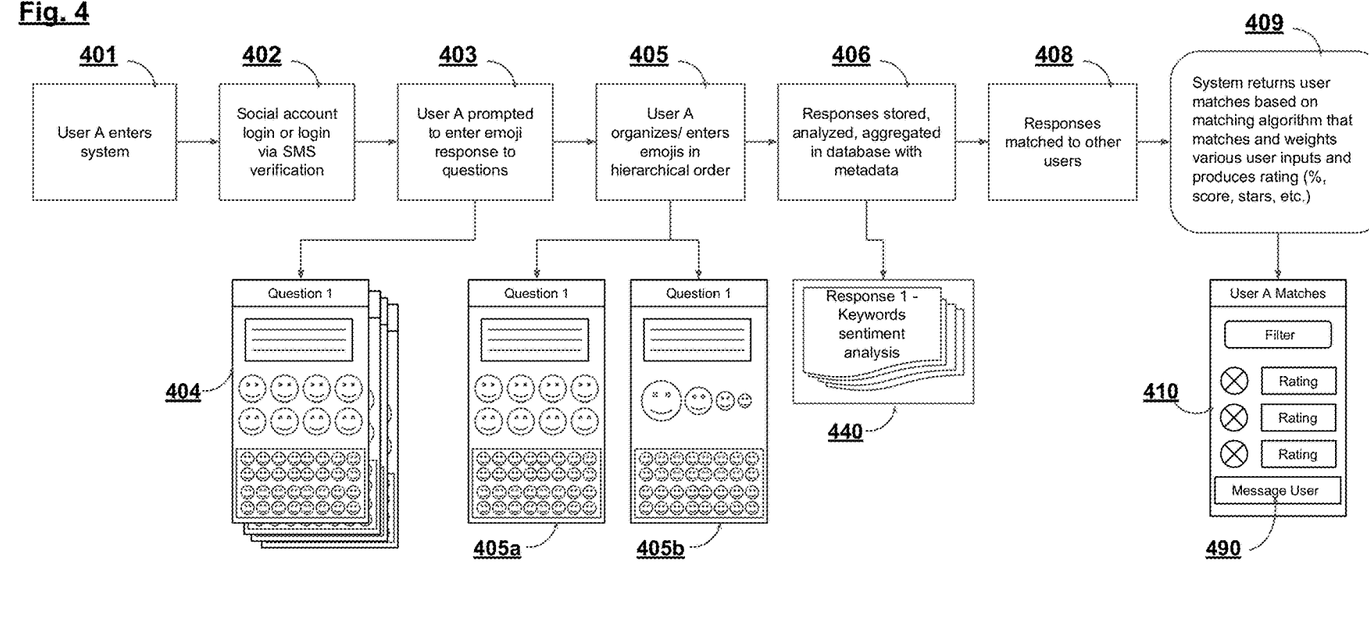
FIG. 4 is a schematic representation of the invention in another preferred embodiment.

FIG. 4 is another embodiment of the system used to match users for relationship match-making (i.e. "dating", "courtship", "companionship", etc.). Users enter the system 401 via client devices 105. User then registers account 402 using social network information and login credentials along with Short Message Service (SMS) verification. User is prompted 403 to respond to series of questions or prompts 404 using only emojis. While in each question response phase, user can then alter and prioritize emojis using Pitching System FIG. 7 (A-D). All responses to questions are stored 406 in database, and a sentimental analysis is executed. In this embodiment, User A is matched another user based on validated compatibilities. In certain embodiments, validated compatibilities is defined as the commonalities between Emoji Banks and Keyword Banks. That is, the emojis used to answer independent questions and prompts are cross-referenced to entries to other user's respective Emoji and Keyword Banks. In some embodiments, users can be matched to a pre-defined Emoji Bank type. A pre-defined Emoji Bank type is a model of a user that has certain traits and emojis that have been aggregated from data gathered from a plurality of users. The system produces and returns matched users to user device 409 and displays matches for User A 410 based on a plurality of common designated preferences. Designated preferences can be defined as user responses to questions or prompts. For example, if the system prompted the question: "Do you like dogs or cats" and the user selects or enters the dog emoji, this means that the user prefers dogs over cats.

Step 401: A client device 105 in the form of mobile device, mobile application, or web application is used to access the system.

Step 402: User inputs social login credentials to gain unique user information on the system. User provides what may be called user profile information which may include education, preferences, biographical information, and other personal information which is stored in the database 102.

Step 403: User is displayed with queried list of questions and prompts from the database.

Step 404: A plurality of questions for user to respond to using emojis.

Step 405: User is prompted with series of questions where they respond using emojis. 405a an emoji keyboard is instantiated 290, and user responds to questions with a selection of emojis which capture users' response that succinctly captures emotional, sensory, sentiment, preference, perception, idea, or feelings. 405a and 405b illustrate the examples of the different ways users can manipulate the pitch, size, and hierarchy of emoji responses.

Step 406: Responses to questions are stored, analyzed, and aggregated.

Step 408: User responses matched within system.

Step 409: System returns matched users based on matching algorithm and produces ratings and scores of potential matches to other users within the system.

Step 410: Users can view matched users with ability to view ratings and message compatible users in the system 490.

Figure 5:
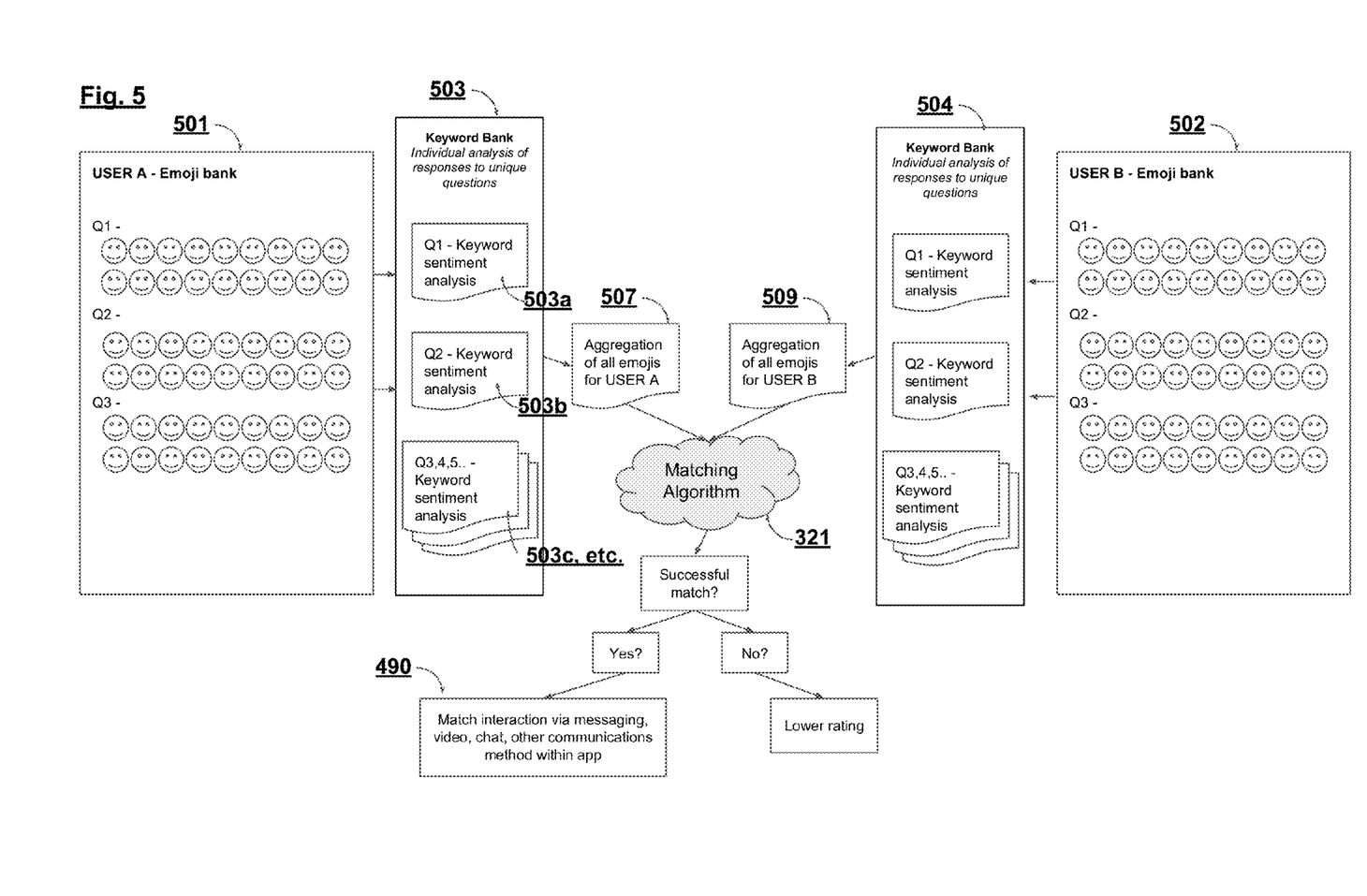
FIG. 5 is the schematic representation of the invention for the embodiment of match-making individuals.

FIG. 5 is a map of underlying matching process for embodiment FIG. 4, whereby users' metadata from emojis are matched with User B metadata. User A Emoji bank 501 is the aggregation of responses from 503 and 404. All responses in Keyword Bank 503 are analyzed then metadata is stored 507 for User A. Each response to unique questions 503a, 503b, 503c, etc. are matched to User B stored aggregated responses 509 and then using algorithm 321, match rating produced and displayed for User A 410.

Step 501: User A's Emoji Bank. The Emoji Bank contains and stores all the user-entered emojis. These emojis are entered and stored into the Emoji Bank when the user responds to a question or prompt.

Step 502: User B's Emoji Bank which contains and stores all user entered emojis. These emojis are entered and stored into the Emoji Bank when the user responds to a question or prompt.

Step 503 and 504: Illustrates the collection of all user responses where each response is analyzed for sentiment. For each question, and for each emoji attached to a question, keywords that the emoji(s) aptly convey are appended to the collection of words appended to the question. This step is performed for every emoji response collected.

Step 507 and 509: Is the aggregation of all user responses to form a plurality of sentiments to be cross-referenced to other users in the system.

Step 321: Is the proprietary matching algorithm that allows the system to analyze commonalities between user responses and the Employer Keyword Bank. Proprietary algorithm may give weighting to the selection of exact emojis, or exact words, or order or hierarchy of selection of emojis etc. For example, proprietary algorithm may give higher weighting to a matching where both parties select the same emojis, in the same order, with the same pitch or similar pitch.

Figure 6:
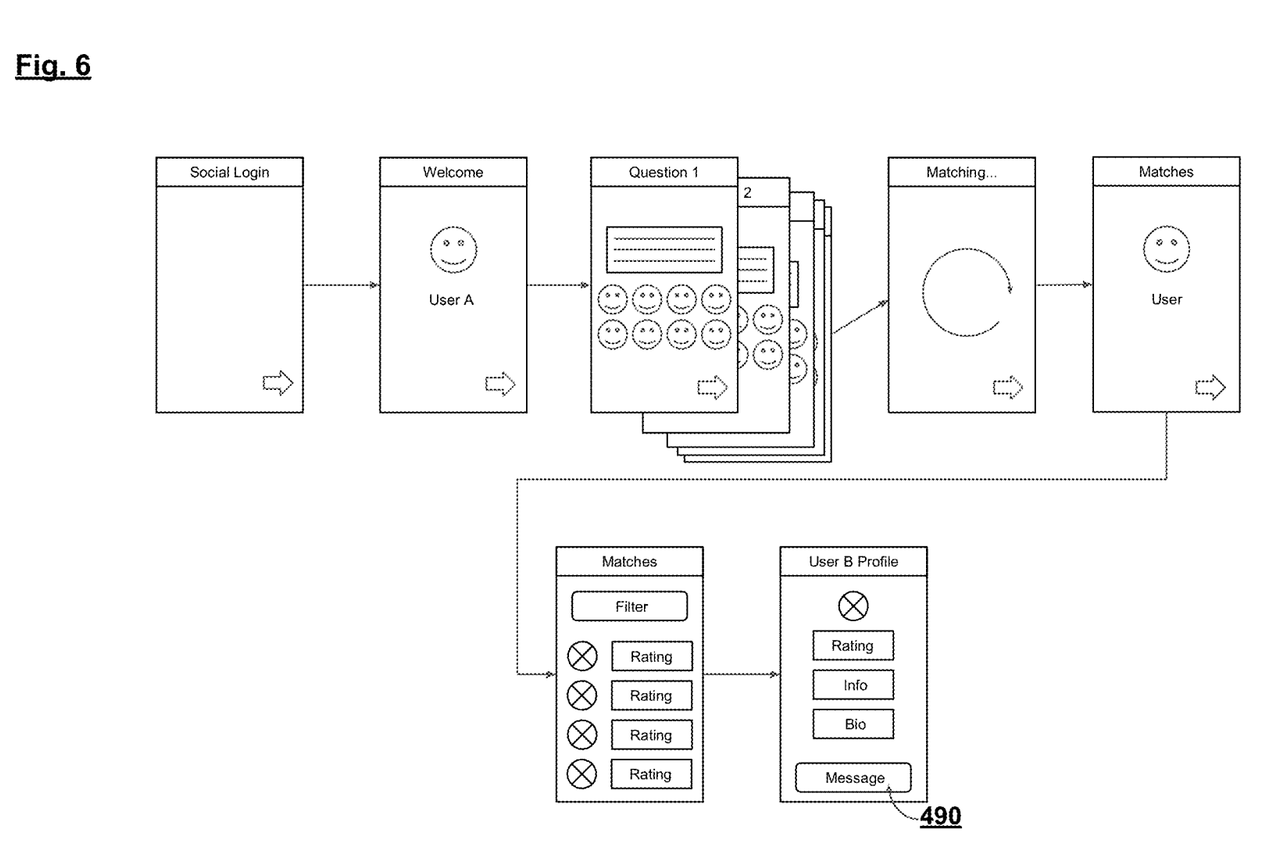
FIG. 6 is the user experience for the embodiment of matchmaking for individual users.

FIG. 6 is the user experience for embodiment FIG. 4. It may be altered in sequence and flow but the overall principles will remain. Users who are matched can contact each other via in-system messaging 490.

Figures 7, 7A:
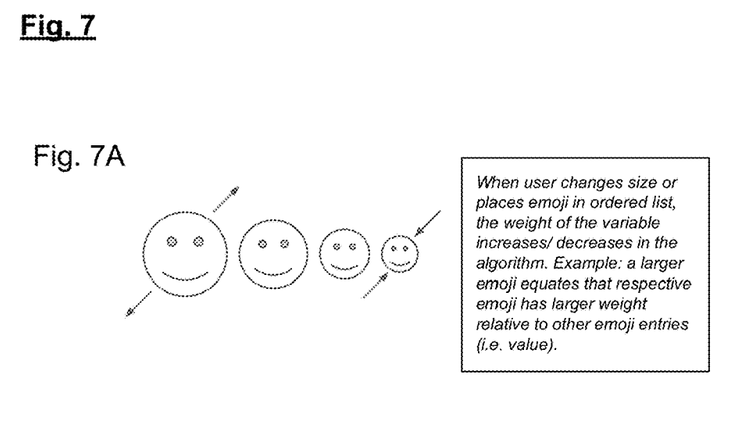
FIG. 7 is a representation of emojis illustrating the pitching system.
FIG. 7A is a representation of the pitching system.

FIG. 7 is the Emoji Weighting or Pitching system for various embodiments.

FIG. 7A illustrates the relative size of emojis which equates to a weighting within algorithm 321. The size, or pitch, of each emoji relative to other emoji responses for each unique question allow the user to alter the importance of each emoji in the algorithm, thus affecting the rating produced. In embodiment FIG. 2, it may be mean a better match for a job. In embodiment FIG. 4, the size of emojis entered may indicate stronger or weaker matches with other users in the system looking for a relationship match.

Figure 7B:
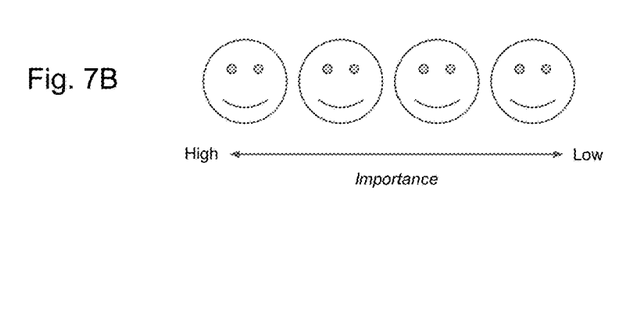
FIG. 7B is a representation of the hierarchy system in one case.
Figure 7C:
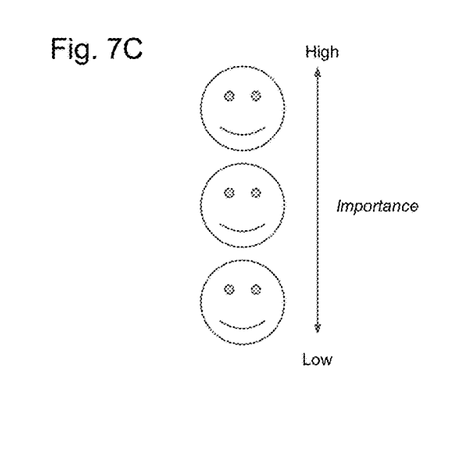
FIG. 7C is a representation of the hierarchy system in another case.
Figure 7D:
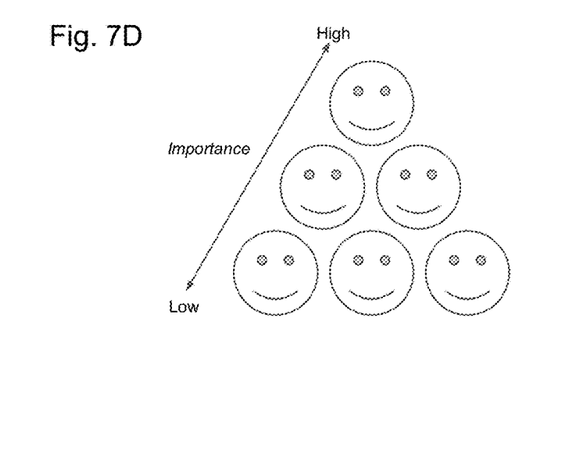
FIG. 7D is a representation of the hierarchy system in another case.

FIG. 7B, FIG. 7C, FIG. 7D illustrates the importance of position of the emojis entered for various embodiments. In these figures, emojis can be placed in various lists, hierarchies, or patterns to indicate importance to the user. The purpose of this positioning is to allow users to indicate importance without having to score or rank responses. Instead users can quickly, easily, and while having a much more interactive experience, move emojis on their device 105 using relative positions to other emojis entered.

What is claimed:

1. A non-transitory processor readable medium storing processor executable instructions that, when executed by a processor, cause the processor to perform a method of ranking, matching, or recommending end-users wherein end-users respond to plurality of questions using emojis which have the capacity to encompass multiple data-points comprising of:
   a. interfacing with one or more end-users via a server that includes a processor device and a memory;
   b. managing information related to one or more end-users wherein end-users are asked to respond to a plurality of questions;
   c. responding, using processing device's emoji-keyboard, to answer plurality of questions asked;
   d. storing, using one or more processing device, candidate emoji responses to questions to a networked storage medium or database, and thereby creating an Emoji Bank for each user;
   e. executing, a sentimental analysis, wherein emojis are converted to words, or series of words accepted as describing an emoji, is placed in a Keyword Bank for each response to a question or prompt along with all other user responses, and for all emojis in a user's Emoji Bank;
   f. matching, using one or more processing devices, based on at least one end-user's Emoji Bank, end-user designated preferences, and on selection rules of pre-defined model profile;
   g. whereby the matching rules are based on proprietary algorithm that matches and weights various user inputs; and
   h. wherein the personality traits of a user is determined from the particular set of emojis and words attached to a user's profile, and the determination of user personality traits from the particular set of personality traits is based, at least in part, on:
   i. answers from the end users to questions provided by a central server including questions prompting end users for responses to questions;
      i. emoji choices from the end user as found in the answers;
      ii. a frequency of emoji usage from the end users in the responses;
      iii. the pitching and size of the emoji response;

iv. validated compatibilities between other users in the system.

2. The non-transitory processor readable medium of claim 1 wherein user may increase or decrease emoji size or order of emoji in ordered list format to indicate an increased or decreased state of emoji emotional representation and gravity or weight of importance within the algorithm.

3. The non-transitory processor readable medium of claim 1, wherein a video recording is uploaded and attached to candidate's profile, and video is transcribed and words from video transcript is included in end user Keyword Bank.

4. The non-transitory processor readable medium of claim 1, wherein user may increase or decrease, by gestures, pinching, or otherwise the dimension, size, and rotation of emoji to capture the importance of desired emoji relative to other emoji entries.

5. The non-transitory processor readable medium of claim 1 including: detecting a gesture on the touch screen display; and, in response to detecting the gesture, increasing or decreasing the recommended emoji character.

6. The non-transitory processor readable medium of claim 1, wherein emoji characters are ordered in accordance to importance or priority to user in which location or order dictates algorithmic weight of entered emojis.

7. A non-transitory processor readable medium storing processor executable instructions that, when executed by a processor, cause the processor to perform a method of ranking, matching, or recommending end-users wherein end-users respond to plurality of questions using emojis which have the capacity to encompass multiple data-points comprising of:
   a. interfacing with one or more end users via client device including mobile device app or a web browser;
   b. manage information related to one or more users;
   c. retrieve, using one or more processing device, from a networked storage medium, a model profile,
   d. retrieve, using one or more processing device, from a networked storage medium, user's Keyword Bank;
   e. determine a sentimental analysis of end user profile; and
   f. compare for each user profile against other user profiles or model profile based on at least one:
      i. model profile designated preferences;
      ii. user's emoji response to questions;
      iii. user's Emoji Bank;
      iv. word choices of user from Keyword Bank;
wherein using proprietary algorithm that produces a score or rating for each user and generating a list of recommended users suitable to model profile.

* * * * *